United States Patent [19]

Grolman et al.

[11] Patent Number: 5,470,559

[45] Date of Patent: Nov. 28, 1995

[54] RECYCLING OF SPENT POT LININGS

[75] Inventors: Robert J. Grolman, Chicoutimi; George C. Holywell, Kingston; Frank M. Kimmerle, Jonquiere; Gilles R. Turcotte, Chicoutimi, all of Canada

[73] Assignee: Alcan International Limited, Montreal, Canada

[21] Appl. No.: 23,954

[22] Filed: Feb. 26, 1993

[51] Int. Cl.⁶ .................. C01F 7/02; C01D 3/02
[52] U.S. Cl. .......... 423/489; 423/490; 423/111; 423/119; 423/131; 588/244; 588/246
[58] Field of Search ............... 423/111, 119, 423/185, 379, 489, 490, 131; 588/244, 246

[56] References Cited

U.S. PATENT DOCUMENTS

| | | | |
|---|---|---|---|
| 2,737,440 | 3/1956 | Roberts et al. | 23/301 R |
| 2,993,754 | 7/1961 | Jenks et al. | 423/379 |
| 4,113,831 | 9/1978 | Orth, Jr. et al. | 423/119 |
| 4,113,832 | 9/1978 | Bell et al. | 423/119 |
| 4,158,701 | 6/1979 | Anderson et al. | 423/119 |
| 4,310,501 | 1/1982 | Reh et al. | 423/484 |
| 4,444,740 | 4/1984 | Snodgrass et al. | 423/483 |
| 4,816,122 | 3/1989 | Lever | 204/182.4 |
| 4,889,695 | 12/1989 | Bush | 423/132 |
| 4,900,535 | 2/1990 | Goodes et al. | 423/484 |
| 4,927,459 | 5/1990 | Gardner et al. | 75/685 |
| 4,973,464 | 11/1990 | Rickman | 423/461 |
| 5,024,822 | 6/1991 | Hittner et al. | 423/111 |
| 5,160,637 | 11/1992 | Bell et al. | 210/766 |
| 5,164,174 | 11/1992 | Banker et al. | 423/659 |
| 5,245,116 | 9/1993 | Bontron et al. | 588/248 |

FOREIGN PATENT DOCUMENTS

| | | |
|---|---|---|
| 632717 | 11/1991 | Australia . |
| 2055135 | 5/1992 | Canada . |
| 51-11095 | 1/1976 | Japan .......................... 423/490 |
| 53-149198 | 12/1978 | Japan . |
| 2056425 | 3/1981 | United Kingdom . |
| WO90/13774 | 11/1990 | WIPO . |
| WO92/12268 | 7/1992 | WIPO . |
| WO92/13801 | 8/1992 | WIPO . |

*Primary Examiner*—Wayne Langel
*Assistant Examiner*—Timothy C. Vanoy
*Attorney, Agent, or Firm*—Cooper & Dunham

[57] ABSTRACT

A process for recycling spent potlining material from aluminum reduction cells contaminated with fluoride and aluminum values. The process comprises first reducing the average particle size of the spent potlining material to smaller than 28 Tyler mesh to form a powder. The powder is then treated with an aqueous sodium hydroxide solution containing about 10 to 60 g/L of sodium hydroxide at a temperature in the range of between 60° and 90° C. to form a solution containing fluoride and sodium aluminate and a residual solid. The solution is removed from the residual solid and the content of NaOH is adjusted in the solution to the range of about 10 to 60 g/L of NaOH, if the content differs from this range, to produce a solution suitable for cyanide destruction. This solution is then heated to a temperature in the range of about 160° to 220° C. at a pressure in the range of about 150 to 350 p.s.i. for a time of between about ½ and 3 hours to destroy cyanide values in the solution. Water is evaporated from the resulting solution to cause fluoride compounds in the solution to crystallize. The fluoride crystals are then separated from the sodium aluminate-containing solution and may be recrystallized or reacted with calcium hydroxide to precipitate calcium fluoride from a solution of sodium hydroxide. The sodium hydroxide may the be used for the treatment of further potlining material.

10 Claims, 1 Drawing Sheet

RECYCLING OF SPENT POT LININGS

BACKGROUND OF THE INVENTION

I. FIELD OF THE INVENTION

This invention relates to the treatment of used linings of aluminum reduction cells, commonly referred to as spent pot linings. More particularly, the invention relates to the treatment of linings of this type to permit safe disposal of the linings and to recover useful values contained in the linings.

II. DESCRIPTION OF THE PRIOR ART

Aluminum is normally produced by dissolving alumina at high temperature (above 900° C.) in molten cryolite ($Na_3AlF_6$) in electrolytic cells, or pots, provided with electrically conductive carbon linings, and electrolyzing the molten solution by passing an electric current between carbon anodes dipping into the melt and the carbon linings acting as cathodes. Cells of this type may be used for considerable periods of time, e.g. up to seven years, and during this time the carbon lining material absorbs sodium fluoride and other contaminants. At the end of the operational lifetime of the cells, the linings are removed and broken up and have to be disposed of in some way. However, the spent lining material, which is composed of carbon, refractory material from insulating refractory bricks and cryolite, including fluorine, aluminum, sodium, calcium and silicon values, along with free and complexed cyanides, carbides and nitrides, is hazardous and must be treated with great caution. Not only are inflammable and explosive gases (particularly hydrogen, methane and ammonia) generated if the linings are contacted by moisture, but also the used lining material contains highly toxic cyanides. The safe disposal of spent linings has therefore presented a challenge to the industry and several methods and schemes have been proposed, as briefly indicated in the following.

Several proposals involve thermal treatment of the linings, e.g. in fluidized beds (as disclosed for example by Tabrey et al in PCT publication WO 90/13774) or rotary kilns (e.g. as disclosed by Banker et al in U.S. Pat. No. 5,164,174). Such methods are intended to destroy the cyanide contents and to convert fluoride values to insoluble salts. However, their disadvantage is that they do not convert the carbon, aluminum and fluoride values into forms that can be recycled and the treated material is suitable only for dumping in land-fill sites. This renders the processes uneconomical.

Another approach involves pyrohydrolysis and pyrosulpholysis, e.g. as disclosed by Bell et al in U.S. Pat. No. 4,113,832. These processes require large expensive reactors and their high capital and operating costs make them uneconomical to operate.

Fixation in a glassy matrix has also been attempted as disclosed by Bontron et al in Canadian Patent 2,055,135, but again this is only capable of converting the material into forms which can be dumped safely in landfill sites.

Gardner et al in U.S. Pat. No. 4,927,459 have provided a way of using the material as a flux and fuel in secondary smelting. Although this disposes of the material, the sodium, aluminum and fluoride values are lost.

Leaching in caustic solutions, either with or without a preliminary heat treatment has also been suggested. Methods involving caustic leaching after a heat treatment are exemplified by Snodgrass et al in U.S. Pat. No. 4,444,740; Rickman in U.S. Pat. No. 4,973,464; Goodes et al in U.S. Pat. No. 4,900,535; Jenkins in WO 92/12268; and Hittner et al in U.S. Pat. No. 5,024,822. Leaching in alkaline solutions made from lime without preliminary heat treatment is exemplified by Gnyra in British patent application GB 2,056,425 and by Kaaber et al in WO 92/13801.

Unfortunately none of these proposals is capable of recovering the carbon and valuable constituents of the potlining material while also dealing safely with the cyanide content, at least in an economical and relatively simple manner.

There is therefore still a need for a safe, economical and relatively simple way of recycling spent potlining materials in equipment that does not require undue capital outlay.

OBJECTS OF THE INVENTION

An object of the invention is to provide a process of treating spent potlining material which permits useful and valuable by-products to be formed.

Another object of the invention is to provide a process of disposing of spent potlining material that safely destroys toxic cyanides and reactive carbides and formates contained in the material.

Another object of the invention is to provide a process of treating spent potlining material that can be operated economically and effectively.

Yet another object of the invention is to provide a process of treating spent potlining material that can deal safely with inflammable or explosive gases that may be produced when the lining material is contacted by moisture.

SUMMARY OF THE INVENTION

The present invention provides a process for recycling spent potlining material contaminated with fluoride and aluminum values. The process comprises first reducing the average particle size of the spent potlining material to smaller than 28 Tyler mesh to form a powder. Size reduction can be done by either dry grinding or wet grinding in a dilute solution of sodium hydroxide. If wet grinding is done, the solids/liquid ratio should be such to give about 50% by weight of solids in the charge in the mill. The powder is then treated with an aqueous sodium hydroxide solution containing about 10 to 60 g/L of sodium hydroxide expressed as NaOH, at a temperature in the range of between 60° and 90° C. to form a solution containing fluoride and aluminate and a residual solid. The treatment of the ground solids with the sodium hydroxide solution is done at a solids to liquid ratio so that between 50 to 200 g of solids, preferably between 100 to 120 g of solids, are present in each litre of slurry. The solution is removed from the residual solid and the content of NaOH is adjusted if necessary in the solution to the range of about 10 to 60 g/L NaOH, if the content differs from this range, to produce a solution suitable for cyanide destruction. The solution suitable for cyanide destruction is then heated to a temperature in the range of about 160° to 220° C. at a pressure in the range of about 150 to 350 p.s.i. for a time of between about ½ and 3 hours to destroy cyanide values in the solution and to produce an essentially cyanide-free solution, containing less than 2 ppm cyanide. Water is evaporated from the cyanide-free solution to cause fluoride compounds in the solution to crystallize, thus producing sodium fluoride crystals and a sodium aluminate-containing solution. The sodium fluoride crystals are then separated from the sodium aluminate-containing solution.

The residual solid from the NaOH digestion is mainly carbon calcium fluoride and brick fragments and can be used as a flux modifier in the steel industry, as a fuel in a cement kiln or can be safely dumped. The sodium aluminate solution is a valuable product which may be used for the Bayer process or for the generation of useful products. The NaF can be purified further by recrystallization or converted to $CaF_2$ preferably by reaction with a saturated solution of a calcium salt. The preferred calcium salt is calcium hydroxide, to give a solution of milk of lime. On reaction with sodium fluoride, this gives sodium hydroxide as the by-product, which is a valuable industrial chemical. Solutions of calcium chloride and calcium sulphate can also be used, but these suffer from the disadvantages that the by-products are respectively sodium chloride and sodium sulphate, which, because they have a very low industrial value and are highly soluble, are difficult to dispose of in an environmentally acceptable manner.

It should be noted in particular that the process of the invention is a hydrometallurgical process that, unlike some prior techniques, does not involve a preliminary heating or roasting step carried out directly on the spent potlining material to destroy cyanide before lixiviation. Instead, the cyanide is destroyed by a heat treatment carried out in solution, which is easier to bring about and control.

It should be noted that the process of the invention is well suited to treating not only spent potlining, but also the chemicals that can be physically separated from the potlining. Depending on the local conditions existing in the reduction plant, these fractions comprise one or more of the following: refractory and structural bricks and brick fragments; carbon; electrolyte or bath which contains predominantly mixtures of aluminium fluoride and sodium fluoride, known as cryolite, and calcium fluoride; and any combination of the aforementioned fractions.

DESCRIPTION OF THE INVENTION AND THE PREFERRED EMBODIMENTS

Figure 1:
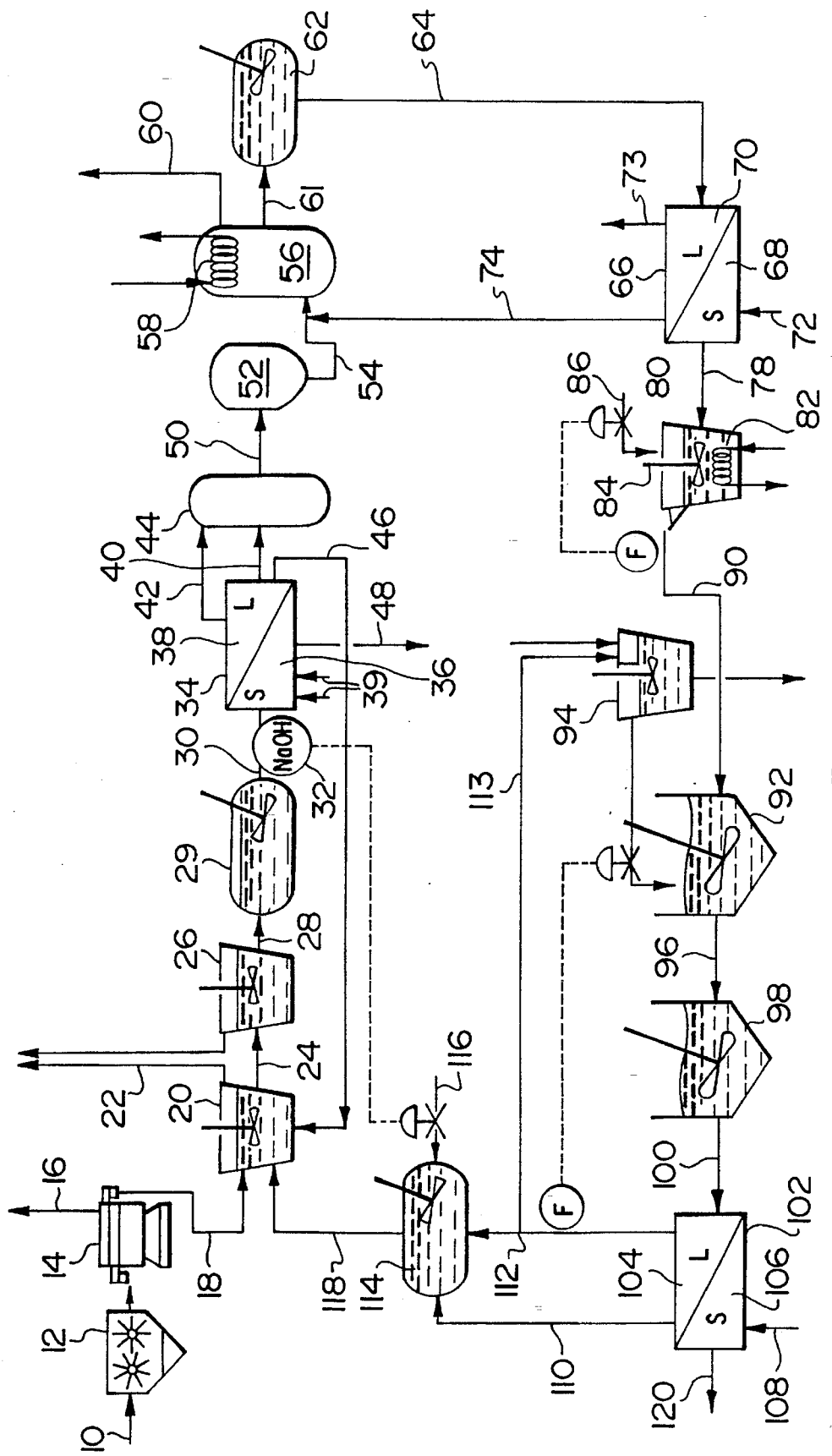
FIG. 1 is a schematic flow diagram illustrating one preferred embodiment of the process of the present invention and equipment used therefor.

The present invention makes it possible to recycle spent potlining material in an environmentally acceptable and safe manner by a process involving caustic digestion.

As a first step, the material removed from the aluminum reduction cell is crushed and/or ground to a small particle size smaller than 28 Tyler mesh, and preferably to 100% minus 65 Tyler mesh. During the size reduction step, large pieces of aluminum metal and iron are removed by screening and/or magnetic separation. This can be accomplished using any suitable conventional crushing and grinding apparatus and screening techniques. Particles of this size have high surface to volume ratios, thus making them quite reactive, and are small enough to be slurried easily in aqueous media.

The crushed potlining is then treated with a dilute aqueous solution containing 10 to 60 g/L, preferably 15 to 30 g/L, of free sodium hydroxide (free hydroxide is that hydroxide not bound in the aluminate ion) at a temperature between 60° and 90° C., preferably between 85° and 90° C. for a period of time in the region of 30 to 90 minutes. This solubilizes the fluoride-containing values and yields a solution containing sodium fluoride, sodium aluminate, sodium cyanide and sodium ferri- and ferro-cyanides, and other soluble constituents, along with insoluble material comprising carbon, calcium fluoride and refractory materials, such as insulating and structural brick, etc. The digestion is also accompanied by the generation of the gases mentioned above, so that care should be taken to avoid pollution and hazard caused by these gases, and also possibly by the precipitation of aluminosilicates.

The insoluble material is then separated from the solution by any suitable means, e.g. by using a vacuum table filter, settling, hydrocloning and centrifugation, followed by washing the insolubles with water, or with a dilute solution of sodium hydroxide, or with a solution of calcium hydroxide. The sodium hydroxide solution can be obtained from a variety of sources such as the washing circuit of a Bayer plant, or from the operations in this process where the sodium fluoride solution is converted to solid calcium fluoride. Washing with a solution of calcium hydroxide serves to precipitate any dissolved fluoride as calcium fluoride. The washing is to remove any adhering and occluded materials, particularly fluorides.

The resulting solid, which is mainly carbon if the starting material is mainly carbon, is pure enough to be recycled for the manufacture of cathodes or the like, can be used as a fuel or can be dumped in landfill sites without risk of causing pollution.

The solution separated from the residual solid is then treated in the following way. If necessary, the caustic content of the liquid is adjusted to 10 to 60 g/L by weight of NaOH to provide the optimum conditions for the subsequent thermal destruction of its cyanide content.

The liquid phase is then subjected to a temperature between about 160° to 220° C., preferably 180° to 200° C., at a pressure which avoids substantial boiling of the water content. This can be done, for example, in a continuous autoclave (e.g. of the type described by Bell et al in U.S. Pat. No. 5,160,637, the disclosure of which is incorporated herein by reference) at a pressure between 150 and 350 psi, preferably 175 to 200 psi, for a residence time of between ½ and 3 hours, more preferably about one hour, to convert the cyanide values (including ferro- and ferri-cyanides) to formate and iron oxide.

Excess water from the liquid phase may then be evaporated off, e.g. in an evaporating crystallizer, preferably in a multiple effect evaporator at a temperature between 100° to 130° C. to produce a solution containing 175 to 300 g/L NaOH, whereupon the fluoride values crystallize out as sodium fluoride. Optionally, seed crystals of NaF may be added to the evaporating crystallizer to promote the crystallization of NaF at a lower concentration of NaOH than would otherwise be required. The seed crystals also tend to cause larger crystals of sodium fluoride to form and this makes them easier to remove by filtration, and avoids the recirculation of a large volume of wash solution saturated with sodium fluoride.

The sodium fluoride precipitate is separated from the remaining liquid phase by a conventional separation technique, e.g. filtration, generally carried out at atmospheric pressure. The crystals are washed preferably with a minimal amount of aqueous solution saturated with sodium fluoride to remove adhering solution, and are then dried. Other liquids, such as water, can be used for washing.

The remaining liquid phase contains soluble sodium aluminate, derived from the potlining contaminants, and only a minimal amount of NaF. The sodium aluminate solution can be used in the manufacture of aluminum-based chemicals, such as those used in water treatment or in other processes which require a solution of caustic, or can be used in the Bayer process for the recovery of the alumina and the caustic values.

If the sodium fluoride crystals are insufficiently pure, they may be dissolved in water, separated from the insoluble impurities by suitable means such as filtration, settling, etc., and then preferably treated in one of the two alternative ways described below.

A first one of these alternatives involves treating the solution with a saturated milk of lime ($Ca(OH)_2$) solution to precipitate the fluoride values as $CaF_2$ and to produce a liquid phase containing NaOH. The reaction time required for this is generally about one hour at a temperature of about 90°–95° C. The resulting solids are separated and the remaining liquid phase containing NaOH may be returned to the beginning of the process where it is used to treat incoming crushed potlining material. The resulting $CaF_2$ can be used for various purposes, e.g. as a feed for the conventional process for making hydrogen fluoride by reacting $CaF_2$ with sulphuric acid. Other calcium salts can be used to convert the sodium fluoride to calcium fluoride, these comprise calcium chloride and calcium sulphate. The problem of using such salts is how to dispose of the by-products. For example the use of calcium chloride and calcium sulphate gives respectively sodium chloride and sodium sulphate by-products which, because they have a very low industrial value and are highly soluble, are difficult to dispose of in an environmentally acceptable manner.

A second alternative is to treat the NaF solution to a second evaporating crystallization to yield crystals of high purity NaF.

The process of the invention can be carried out in conventional, relatively inexpensive equipment at reasonable cost and is capable of recovering useful carbon, sodium fluoride and sodium aluminate solutions while safely and completely eliminating toxic cyanides.

The invention is described in more detail below with reference to FIG. 1 showing a schematic flow diagram of a typical process according to the present invention.

Spent pot lining 10 is first introduced into a crusher 12 to break up the lining material into smaller pieces and the pieces are then further reduced in size to minus 65 Tyler mesh in a grinder and screen unit 14. Dust created in the grinder and screen unit is removed at 16 and trapped by a filter unit (not shown). Sufficient ground and screened material 18 to give 100 to 120 g of solids per liter of slurry, is introduced into a first slurry mixer and digester 20 where it is mixed with dilute NaOH solution introduced from sources indicated later. Inflammable and explosive gases produced during the mixing procedure are extracted at 22 and conveyed to a flare vent (not shown). The resulting slurry 24 is then passed to a second mixer and digester 26, which is also vented to a flare vent in the same manner as mixer and digester 20, for a further period of treatment with the NaOH solution. The slurry 28 is then conveyed to a surge tank 29 to equalize flow rates and volumes so that further steps can be carried out at a constant flow rate and to provide sufficient residence time for the desilication reaction to be completed. The slurry material 30 from the surge tank may have additional NaOH mixed with it from an NaOH tank 32 and is then passed to a press filter 34 which retains solid in a first compartment 36 and allows liquid to flow to a second compartment 38. A washing fluid 39 may be introduced into the solids compartment 36 to wash the retained solids and both the filtrate 40 and the wash liquid 42 is passed to a cyanide destruction reactor 44. However, part of the solids and filtrate from the press filter 34 may be recycled at 46 to the first slurry mixer and digester 20 for use in treating the incoming ground and screened potlining material, and to provide seed material for the desilication reaction in 29.

After the solids in compartment 36 have been washed, they are removed from the compartment at 48 and exit the apparatus. This material consists of carbon and inert solid constituents, such as particles of firebrick and the like, and may be used or disposed of without risk of contamination or pollution by toxic constituents.

The filtrate 40 in the reactor 44 is heated as indicated above to convert contained ferro- and ferri-cyanides into ammonia and iron oxides and the product solution 50 is passed on to flash tank 52 where it is depressurized, flash cooled, and thereby concentrated, and from there at 54 to evaporator crystallizer 56 heated by a steam coil 58. Water vapor produced in the crystallizer 56 is removed at 60 and condensed in a condenser (not shown). The remaining slurry of liquid and NaF crystals is first conveyed at 61 to a surge tank 62 and from there at 64 to a second pressure filter 66 divided into a solids compartment 68 and a liquids compartment 70. Wash liquid 72 saturated with sodium fluoride can be introduced into the filter unit to wash the retained solid and is returned to the evaporator crystallizer 56 for recovery of any dissolved NaF. The filtrate from the pressure filter, which is a sodium aluminate solution, is removed at 73 and may, if desired, be conveyed to a Bayer process treatment plant or used for other purposes known for sodium aluminate solutions.

The solids retained in the filter 66 consists of NaF crystals which are removed at 78 and transferred to a dissolution mixer 80 heated by steam coil 82 and provided with a mixer 84 where the solid is re-dissolved in water added via line 86. The resulting solution 90 is conveyed to a first milk of lime reactor 92 where it is mixed and reacted with saturated $Ca(OH)_2$ from a lime slaker 94 where lime is mixed with water. The reaction product is then fed at 96 to a second lime reactor 98 for completion of the reaction to cause precipitation of $CaF_2$. The resulting slurry of liquid and solid is fed at 100 to a filter 102 having a liquids compartment 104 and a solids compartment 106. The filtered solids may be washed with water from line 108 and the wash water is removed at line 110. Filtrate from the compartment 104 is mainly NaOH solution which is conveyed via 112 to a make-up tank 114, which also receives the wash water via line 110. However, some of the filtrate may be fed via line 113 to lime slaker 94 for use in the lime slaking process. As required, concentrated NaOH solution is added via 116 to the make-up tank 114 to produce a dilute NaOH solution having a concentration suitable for the treatment of the incoming ground potlining material, and then the solution is fed via line 118 to the first slurry mixer digester 20 as the dilute NaOH treatment solution.

The solid removed in the filter 102 is calcium fluoride which is removed from the apparatus at 120. For the solid-liquid separation, tests have shown that table, belt, pressure and plate and frame filters give satisfactory results. Other types of solid—liquid separators can also be used.

The overall result of the illustrated process is to convert spent potlining material into an inert carbon-containing product 48, a sodium aluminate solution 73 and solid calcium fluoride 120. The NaOH required for the treatment is largely recycled and consequently does not contribute significantly to the cost of the process. The lime required for the conversion to $CaF_2$ is inexpensive. Heat input is required for the destruction reactor 44, the evaporator crystallizer 56 and the dissolution mixer 80, but only in reasonable quantities. Consequently, the overall process is economical and produces products which have economic value to offset the operational costs. Meanwhile, the toxic cyanides contained in the potlining material are destroyed safely and effectively without the need for complex apparatus and expensive reactants.

EXAMPLE 1

A spent potline was processed having the composition given in Table 1 below. The material was ground to pass 28 mesh Tyler screens. The ground material was added to a solution containing 30 g/L NaOH, at a charging rate to give 100 g of solids per liter of slurry. The slurry was heated to 85° C., and held at this temperature for 1 hour to complete the extraction and the desilication of the solution. The slurry was filtered on a table filter and washed with water at the rate of 2 L of water per kg of solids. The filtrate contained only 1.5 g/L of dissolved silicon, indicating a satisfactory desilication.

The extracted washed solids comprised brick fragments, carbon, and less than 150 ppm of $CaF_2$, and between 200 and 300 ppm of complexed cyanides as ferro and ferri cyanides. These low concentrations indicated that more than 85% of the fluoride values, and more than 90% of the cyanides values originally present had been extracted.

The filtrate was treated in the continuous autoclave at a temperature of 180° C. for 1 hour. Analysis of the effluent indicated that more than 99% of the incoming free and complexed cyanide values had been converted to formate and iron oxides.

The essentially cyanide free effluent was then treated in a vacuum evaporator/crystallizer at a temperature of 120° C. until sufficient water had been evaporated to bring the NaOH concentration to 200 g/L. At this concentration, the fluoride values crystallized out as filtrable crystals. These were collected on a table filter. The filtrate was a solution of sodium aluminate, which could be sent to the digestion circuit of a Bayer plant to recover the sodium and aluminum values. The crystals of sodium fluoride were washed with an aqueous solution, saturated with sodium fluoride to remove all surface and occluded sodium aluminate liquor. The washed crystals were dissolved in water, and then treated with a filtered saturated solution of milk of lime. This yielded crystals of calcium fluoride, which were separated and washed with water on a table filter. The washed crystals contained 97% $CaF_2$.

TABLE 1

| SPL | % |
|---|---|
| NaF | 13.6 |
| $Na_3AlF_6$ | 4.8 |
| C | 31.9 |
| $SiO_2$ (54% reactive) | 10.8 |
| $CaF_2$ | 1.4 |
| $Al(OH)_3$ | 5.4 |
| $Al_2O_3$ | 3.2 |
| $NaAl_{11}O_{17}$ | 1.2 |
| $NaAlSiO_4$ | 12.0 |
| $Na_4Fe(CN)_6$ | 0.1 |
| KF | 0.7 |
| LiF | 1.0 |
| $Fe_2O_3$ | 1.6 |
| $Na_2SO_4$ | 0.4 |
| $Na_2CO_3$ | 4.0 |
| $Al_4C_3$ | 0.1 |
| AlN | 0.1 |
| Na (metal) | 4.5 |

TABLE 1-continued

| SPL | % |
|---|---|
| CN (total) | 0.1 |
| as NaCN & | — |
| as $Na_4Fe(CN)_6$ | — |
| CN free as NaCN | 0.0 |
| $H_2O$ | 1.0 |
| Total dry basis | 97.2 |

What we claim is:

1. A process of recycling spent potlining material containing carbon values contaminated with fluoride, sodium, aluminum and cyanide values and for enabling said carbon, sodium, fluoride and aluminum values to be recovered in a usable form, which process comprises:

reducing an average particle size of the spent potlining material to smaller than 28 Tyler mesh to form a powder;

without having destroyed the cyanide values by heating the powder, treating the powder with an aqueous sodium hydroxide solution containing about 10 to 60 g/L of sodium hydroxide at a temperature in the range of between 60° and 90° C. to form a solution containing fluoride, aluminate and said cyanide values, and a residual solid containing said carbon values;

removing the solution from the residual solid;

adjusting the content of NaOH in the solution within a range of about 10 to 60 g/L of NaOH, if said content differs from said range, to produce a solution suitable for destruction of said cyanide values;

heating said solution suitable for destruction of said cyanide values to a temperature in the range of about 160° to 220° C. at a pressure in the range of about 150 to 350 p.s.i. for a time of between about ½ and 3 hours to destroy said cyanide values in said solution and to produce a cyanide-free solution;

evaporating water from said cyanide-free solution to cause fluoride compounds in said solution to crystallize therefrom, thus producing fluoride crystals containing said fluoride values from said potlining and a sodium aluminate-containing solution containing said sodium and aluminum values from said potlining; and separating said fluoride crystals from said sodium aluminate-containing solution.

2. A process according to claim 1 wherein said spent potlining material is reduced to particles having a size less than 65 Tyler mesh.

3. A process according to claim 1 wherein said aqueous sodium hydroxide solution contains from 15 to 30 g/L of sodium hydroxide.

4. A process according to claim 1 wherein said powder is treated with said aqueous sodium hydroxide solution at a temperature in the range of 85° to 90° C.

5. A process according to claim 1 wherein the solution suitable for destruction of said cyanide values is heated to a temperature in the range of 180° to 200° C.

6. A process according to claim 1 wherein water is evaporated from said cyanide-free solution until the NaOH concentration reaches the range of 175 to 300 g/L.

7. A process according to claim 1 wherein seed crystals of NaF are added to the cyanide-free solution to facilitate the formation of NaF crystals therein.

8. A process according to claim 1 wherein said fluoride crystals separated from said sodium aluminate-containing solution are subjected to recrystallization to produce crystals of NaF of improved purity.

9. A process according to claim 1 wherein said fluoride crystals are dissolved in an aqueous medium and reacted with calcium hydroxide to precipitate calcium fluoride, leaving an aqueous solution containing sodium hydroxide.

10. A process according to claim 9 wherein said aqueous solution containing sodium hydroxide is used for treating said powder of spent potlining material, after adjusting sodium hydroxide content of said aqueous solution to 10 to 60 g/L, if said content is outside said range.

* * * * *